United States Patent
Mu et al.

(10) Patent No.: US 11,761,711 B1
(45) Date of Patent: Sep. 19, 2023

(54) HEAT STORAGE AND HEAT RELEASE SYSTEM FOR MOLTEN SALT WITH STEAM HEATING

(71) Applicant: Beijing Minli Energy Storage Technology Co., Ltd., Beijing (CN)

(72) Inventors: Shihui Mu, Beijing (CN); Shuguang Zhao, Beijing (CN); Siyuan Yu, Beijing (CN); Zhenguo Yuan, Beijing (CN); Jianxin Wang, Beijing (CN)

(73) Assignee: Beijing Minli Energy Storage Technology Co., Ltd., Beijing (CN)

( * ) Notice: Subject to any disclaimer, the term of this patent is extended or adjusted under 35 U.S.C. 154(b) by 0 days.

(21) Appl. No.: 18/135,468

(22) Filed: Apr. 17, 2023

(30) Foreign Application Priority Data

Apr. 21, 2022 (CN) .......................... 202210421848.6

(51) Int. Cl.
*F28D 20/00* (2006.01)
*F28F 27/00* (2006.01)
*F24D 1/02* (2006.01)

(52) U.S. Cl.
CPC ........ *F28D 20/0034* (2013.01); *F28F 27/006* (2013.01); *F24D 1/02* (2013.01); *F28D 2020/0047* (2013.01); *F28D 2020/0069* (2013.01); *F28D 2020/0078* (2013.01)

(58) Field of Classification Search
CPC ......... F28D 20/0034; F28D 2020/0047; F28D 2020/0069; Y02E 60/14
See application file for complete search history.

(56) References Cited

U.S. PATENT DOCUMENTS

| 2010/0175687 A1* | 7/2010 | Zillmer | ..................... F16L 9/18 126/643 |
| 2013/0291857 A1* | 11/2013 | Litwin | ..................... F03G 6/067 126/643 |

FOREIGN PATENT DOCUMENTS

| CN | 210374745 U | * 4/2020 |
| CN | 212109580 U | 12/2020 |

OTHER PUBLICATIONS

Youxia et al., Brief Introduction to the Design of Solar Thermal Power Molten Salt Steam Generation System. Shandong Electric Power. 4 pages, Oct. 25, 2020.
(Continued)

*Primary Examiner* — Eric S Ruppert
(74) *Attorney, Agent, or Firm* — NIELDS, LEMACK & FRAME, LLC

(57) ABSTRACT

A heat storage and heat release system for molten salt with steam heating is provided. The heat storage and heat release system for molten salt with steam heating includes a low-temperature molten salt tank, a high-temperature molten salt tank, molten salt pumps, a boiler barrel, a fixed tube-plate heat exchanger and a drum. The boiler barrel, the fixed tube-plate heat exchanger and the drum are arranged from high to low and are respectively. At least one molten salt outlet pipe and at least one molten salt returning pipe from the low-temperature molten salt tank are connected with the tube pass of the fixed tube-plate heat exchanger. At least one molten salt outlet pipe and at least one molten salt returning pipe from the high-temperature molten salt tank are connected with the tube pass of the fixed tube-plate heat exchanger.

9 Claims, 3 Drawing Sheets

(56) References Cited

OTHER PUBLICATIONS

Chinese communication, with English translation, dated Aug. 22, 2022 in corresponding Chinese patent application No. 202210421848.6.

Chinese communication, with English translation, dated Sep. 13, 2022 in corresponding Chinese patent application No. 202210421848.6.

* cited by examiner

US 11,761,711 B1

HEAT STORAGE AND HEAT RELEASE SYSTEM FOR MOLTEN SALT WITH STEAM HEATING

CROSS-REFERENCE TO RELATED APPLICATION

This patent application claims the benefit and priority of Chinese Patent Application No. 202210421848.6 filed with the China National Intellectual Property Administration on Apr. 21, 2022, the disclosure of which is incorporated by reference herein in its entirety as part of the present application.

TECHNICAL FIELD

The present disclosure belongs to the technical field of clean heating, in particular to a heat storage and heat release system for molten salt with steam heating.

BACKGROUND

In recent years, the investment of China in new energy has been greatly increased, and the new energy industry has also been expanded rapidly. Especially, the heat demand in northern China is increased in winter, and the energy market demand far exceeds the domestic production speed. There is an urgent need for new energy replacing traditional fossil fuels or the improvement on energy efficiency to reduce energy waste. With the increase of installed capacity of new energy sources such as wind energy and photovoltaic energy, the power generation load of traditional thermal power units needs to give way to the power generation load of new energy. Peak shaving operation is required for traditional thermal power units. When the peak shaving requirement cannot be met under the condition that the generator units are already in the lowest load operation, energy storage means is needed. So, traditional thermal power plants need to be provided with energy storage systems. At present, there are two main energy storage routes: firstly, electric energy which is generated by the generator unit is used for energy storage; and secondly, main steam in front of the high-pressure cylinder is used for energy storage.

The heat-to-electricity conversion efficiency of heat storage of the electric energy which is generated by the generator unit is relatively high, and the operation of the heat storage is relatively stable. However, most of the heat is lost along with the operation of the united equipment in the heat-to-electricity conversion process and electricity-to-heat conversion process, so that the overall utilization efficiency of the energy is low. In the case that the main steam in front of the high-pressure cylinder is directly used for heat storage, the heat is directly exchanged at one time to be stored in the heat storage system, so that the overall efficiency for heat storage is high. The system using main steam for heat storage is relatively simple compared with electric heating. However, pipelines of the existing system using main steam for heat storage are relatively complex, the heat dissipation area is larger, and the energy utilization rate is low, so the existing system is not suitable for popularization and use.

SUMMARY

Aiming at the disadvantages in the prior art, the technical problem to be solved by some embodiments is to provide a heat storage and heat release system for molten salt with steam heating. The heat storage and heat release system uses industrial steam as a heat source. The heat of steam is stored and released through the heat storage and heat release system for molten salt, where the heat storage and heat release system includes a fixed tube-plate heat exchanger, a boiler barrel, a drum and a molten salt tank. So, the occupied area of the heat storage and heat release system is greatly reduced compared with the traditional heat storage system while efficient utilization of industrial waste steam in thermal power plants or heat power plants is ensured.

The technical scheme of the present disclosure to solve the technical problem is as follows. A heat storage and heat release system for molten salt with steam heating is provided, including a low-temperature molten salt tank, a high-temperature molten salt tank and molten salt pumps. The heat storage and heat release system also includes a boiler barrel, a fixed tube-plate heat exchanger and a drum. The boiler barrel, the fixed tube-plate heat exchanger and the drum are arranged from high to low according to vertical heights, are respectively located at different horizontal heights, and are connected in sequence through pipelines. Each of the pipelines is provided with an electric valve for the pipelines.

The connectors on both sides of a tube pass of the fixed tube-plate heat exchanger are respectively connected with the low-temperature molten salt tank and the high-temperature molten salt tank; at least one first molten salt outlet pipe and at least one first molten salt returning pipe from the low-temperature molten salt tank are connected with the tube pass of the fixed tube-plate heat exchanger, and at least one second molten salt outlet pipe and at least one second molten salt returning pipe from the high-temperature molten salt tank are connected with a shell pass of the fixed tube-plate heat exchanger; a first mother tube for converging all molten salt outlet pipes of the low-temperature molten salt tank and a second mother tube for converging all molten salt outlet pipes of the high-temperature molten salt tank are each provided with a molten salt electric valve, and a third mother tube for converging all molten salt returning pipes of the low-temperature molten salt tank and a fourth mother tube for converging all molten salt returning pipes of the high-temperature molten salt tank are each provided with a molten salt electric valve.

A condensed water discharge port is provided at a bottom of the drum, a steam outlet and a softened water replenishing port are provided on the boiler barrel, and a steam inlet is provided on the fixed tube-plate heat exchanger.

In the embodiment, there are two molten salt outlet pipes and one molten salt returning pipe. The tube pass, connected with the fixed tube-plate heat exchanger, of the low-temperature molten salt tank is provided with three branches, including the two molten salt outlet pipes that the low-temperature molten salt is pumped to the fixed tube-plate heat exchanger through the low-temperature molten salt pump in the heat storage process of the system, and the molten salt returning pipe that the low-temperature molten salt flows into the low-temperature molten salt tank from the fixed tube-plate heat exchanger in the heat release process of the system. The shell pass, connected with the high-temperature molten salt tank, of the fixed tube-plate heat exchanger is also provided with three branches, including the two molten salt outlet pipes that the high-temperature molten salt is pumped to the fixed tube-plate heat exchanger through the high-temperature molten salt pump in the heat release process of the system, and the molten salt returning pipe that the high-temperature molten salt flows into the high-temperature molten salt tank from the fixed tube-plate heat exchanger in the heat storage process of the system.

Each of the at least one first molten salt outlet pipe of the low-temperature molten salt tank and the at least one second molten salt outlet pipe of the high-temperature molten salt tank is provided with a molten salt pump, and a bottom end of each of the at least one first molten salt returning pipe and the at least one second molten salt returning pipe extends into a corresponding one of the low-temperature molten salt tank and the high-temperature molten salt tank, and is connected with a corresponding one of molten salt distribution rings; the molten salt is a circulation working medium in the tube pass of the fixed tube-plate heat exchanger, and water and the steam is a circulation working medium in the shell pass of the fixed tube-plate heat exchanger.

The high-temperature molten salt tank and the low-temperature molten salt tank are respectively arranged to be lower than the fixed tube-plate heat exchanger, and located below the fixed tube-plate heat exchanger.

a remote liquid level meter (liquid level sensor) is arranged in the drum, the remote liquid level meter is configured to collect data for a liquid level of condensed water in the drum, a liquid level electric valve is arranged on a pipe of the condensed water discharge port, the condensed water discharge port is connected with an external condensed water recovery unit, the liquid level electric valve is configured to be opened when the liquid level in the drum reaches ¾ (liquid level upper limit) of a height of the drum, and the liquid level electric valve is configured to be closed when the liquid level in the drum drops below ¼ (liquid level lower limit) of the height of the drum.

The outer walls of the low-temperature molten salt tank, the high-temperature molten salt tank, the fixed tube-plate heat exchanger, the boiler barrel, the drum and all pipes and valves are all covered with insulating layers, and a thermal conductivity of materials used for the insulating layers is not higher than 0.04 W/(m·K).

The low-temperature molten salt tank and the high-temperature molten salt tank are made of 0Cr19Ni9 and other high-hardness and molten salt corrosion resistant materials.

The fixed tube-plate heat exchanger, the boiler barrel and the drum are made of 0Cr17Ni12Mo2 and other high-temperature and molten salt corrosion resistant materials.

Compared with the prior art, some embodiments have the following beneficial effects.

Firstly, a heat storage system and a heat release system are integrated in the heat storage and heat release system for molten salt with steam heating, and the heat storage and release process of the heat storage and heat release system for molten salt is completed by only three devices, including the boiler barrel, the fixed tube-plate heat exchanger and the drum. The occupied area of the system is greatly reduced, the complexity of the pipelines of the system is reduced, the heat dissipation area of the system is reduced, the investment and construction cost is reduced by 10-15%, and the efficiency of the system is improved by 5-10%.

Secondly, the boiler barrel, fixed tube-plate heat exchanger and the drum are arranged in layers, and the working medium in the system flows naturally during the operation of the system by using the height difference between every two of the three devices, so that the number of the pumps and pipelines between the every two of the three devices is reduced, and the construction cost and operation cost are reduced.

Thirdly, in the heat storage process, the system effectively collects the condensed water of the working medium after heat exchange of the steam of the heat source, and the drum is arranged to collect and uniformly discharge the condensed water of the working medium to the condensed water recovery unit of the construction unit, and the waste heat of the steam in the plant is fully recovered, stored and reused. So, the heat use efficiency of the plant is improved, the benefit is improved, and the cost is reduced.

Figure 1:
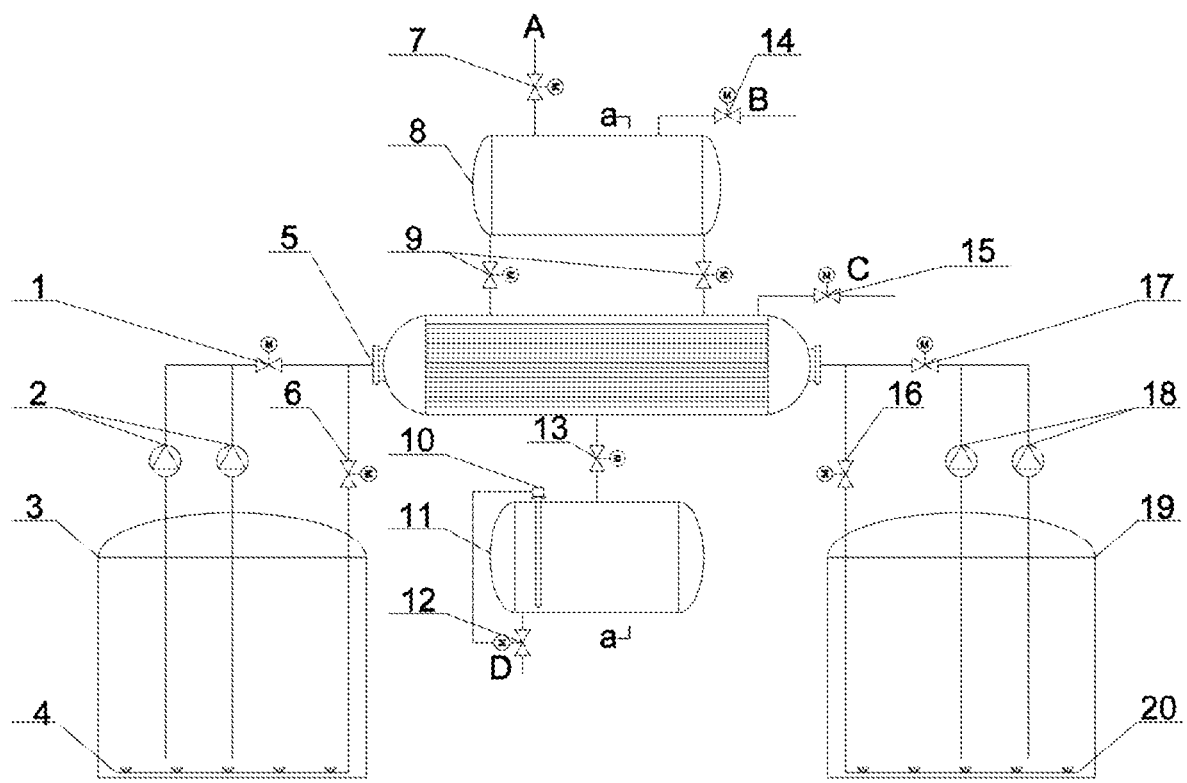
FIG. 1 is a system process diagram of a heat storage and heat release system for molten salt with steam heating according to an embodiment of the present disclosure.

Reference signs: 1 fourth molten salt electric valve; 2 low-temperature molten salt pump; 3 low-temperature molten salt tank; 4 low-temperature molten salt distribution ring; 5 fixed tube-plate heat exchanger; 6 first molten salt electric valve; 7 first electric valve; 8 boiler barrel; 9 second electric valve; 10 liquid level sensor; 11 drum; 12 liquid level electric valve; 13 third electric valve; 14 fourth electric valve; 15 fifth electric valve; 16 second molten salt electric valve; 17 third molten salt electric valve; 18 high-temperature molten salt pump; 19 high-temperature molten salt tank; 20 high-temperature molten salt distribution ring; A steam outlet; B softened water replenishing port; C steam inlet; and D condensed water discharge port.

DETAILED DESCRIPTION OF THE EMBODIMENTS

The description of the present disclosure is further described in conjunction with the following attached figures and embodiments. The specific embodiments are only used for further description of the present disclosure, but not regarded as limitation for the present disclosure.

The present disclosure provides a heat storage and heat release system for molten salt with steam heating. The top of the low-temperature molten salt tank 3 is provided with a first molten salt returning pipe, a first molten salt outlet pipe and a second molten salt outlet pipe. The top of the high-temperature molten salt tank 19 is provided with a second molten salt returning pipe, a third molten salt outlet pipe and a fourth molten salt outlet pipe. The first molten salt outlet pipe and the second molten salt outlet pipe are each provided with a low-temperature molten salt pump 2. The first molten salt returning pipe is provided with a first molten salt electric valve 6 and a low-temperature molten salt distribution ring 4. Similarly, the third molten salt outlet pipe and the fourth molten salt outlet pipe are each provided with a high-temperature molten salt pump 18. And the second molten salt returning pipe is provided with a second molten salt electric valve 16 and a high-temperature molten salt distribution ring 20. The low-temperature molten salt distribution ring 4 is connected with the first molten salt returning pipe, the first molten salt returning pipe extend through the top of the low-temperature molten salt tank 3, and the portion of the first molten salt returning pipe which extending out of the low-temperature molten salt tank 3 is provided with the first molten salt electric valve 6. The first molten salt outlet pipe and the second molten salt outlet pipe are combined into a first mother tube, and a fourth molten salt electric valve 1 is arranged on the first mother tube. The first mother tube is connected with one end of the tube pass of the fixed tube-plate heat exchanger 5 after converging the first molten salt returning pipe. The high-temperature molten salt distribution ring 20 is connected with the second molten salt returning pipe, the second molten salt returning pipe extend through the top of the high-temperature molten salt tank 19, and the portion of the second molten salt returning pipe which extending out of the high-temperature molten salt tank 19 is provided with the second molten salt electric valve 16. The third molten salt outlet pipe and the fourth molten salt outlet pipe are combined into a second mother tube, and a third molten salt electric valve 17 is arranged on the second mother tube. The second mother tube is connected with another end of the tube pass of the fixed tube-plate heat exchanger 5 after converging the second molten salt returning pipe.

In the heat storage process of the system, the low-temperature molten salt is pumped from the low-temperature molten salt tank 3 into the tube pass of the fixed tube-plate heat exchanger 5 through the low-temperature molten salt pump 2 so as to be heated by the heat exchange with the supersaturated steam. The heated molten salt uniformly flows into the high-temperature molten salt tank 19 through the second molten salt returning pipe with the second molten salt electric valve 16 and the high-temperature molten salt distribution ring 20. In the heat release process of the system, the high-temperature molten salt is pumped from the high-temperature molten salt tank 19 into the tube pass of the fixed tube-plate heat exchanger 5 through the high-temperature molten salt pump 18 so as to be cooled by the heat exchange with water. The cooled molten salt uniformly flows into the low-temperature molten salt tank 3 through the first molten salt returning pipe with the first molten salt electric valve 6 and then the low-temperature molten salt distribution ring 4.

The fourth molten salt electric valve 1 and the third molten salt electric valve 17 are electrically connected with the control unit. The opening or closing adjustment is carried out according to different processes of heat storage and heat release, so that the heat release process and the heat storage process are integrated together and completed by one set of equipment.

The upper end of the boiler barrel 8 is provided with a softened water replenishing port B and a steam outlet A. The softened water replenishing port B and the steam outlet A are respectively provided with a fourth electric valve 14 and a first electric valve 7 for respectively controlling the opening and closing of the softened water replenishing port B and the steam outlet A. The lowest point of the lower end of the boiler barrel 8 is provided with two pipes connected with the shell pass of the fixed tube-plate heat exchanger 5. The opening and closing of the two pipes at the lowest point of the lower end of the boiler barrel are each controlled by a second electric valve. In the heat release process of the whole system, the softened water replenished from the softened water replenishing port B flows into the boiler barrel 8 by gravity. At this time, two second electric valves are opened. The softened water flows into the waterway of the shell pass of the fixed tube-plate heat exchanger 5 from the two pipes at the lowest point of the boiler barrel 8. After the shell pass of the fixed tube-plate heat exchanger 5 is filled with the softened water, there is also an amount of softened water in the boiler barrel 8, the two second electric valves are kept open, the fourth electric valve 14 is closed, and the first electric valve is opened. At this time, the shell pass of the boiler barrel 8 and the fixed tube-plate heat exchanger 5 can be considered as an integrated structure. The softened water exchanges heat with the high-temperature molten salt medium in the tube pass of the fixed tube-plate heat exchanger 5. The softened water exchanges heat and evaporates in the boiler barrel 8 so as to supply for the heat user to use in a form of steam through the steam outlet A.

The upper end of the drum 11 is provided with a connecting pipe with the lowest point of the shell pass of the fixed tube-plate heat exchanger 5. The opening and closing of the connecting pipe between the drum and the lowest point of the shell pass of the fixed tube-plate heat exchanger 5 are controlled by a third electric valve 13. A condensed water discharge port D with a liquid level electric valve 12 is provided at the lowest point of the lower end of the drum 11. In the heat storage process of the system, a supersaturated steam is introduced into the steam inlet C of the fixed tube-plate heat exchanger 5. The supersaturated steam enters the shell pass of the fixed tube-plate heat exchanger 5 to exchange heat with the low-temperature molten salt in the tube pass. After heat exchange, the supersaturated steam is condensed into liquid water, and the liquid water flows into the drum 11 from the lowest point of the shell pass of the fixed tube-plate heat exchanger 5. A liquid level sensor 10 is installed in the drum 11 at a ¾ height of the drum. The liquid level sensor is electrically connected with the liquid level electric valve 12. After an amount of condensed water exists in the drum 11, a liquid level signal is converted into an electric signal by the liquid level sensor 10, and the electric signal is transmitted to the liquid level electric valve 12 to control the opening of the liquid level electric valve 12. At this time, the condensed water in the drum is discharged to the factory through the condensed water discharge port D. So, the centralized collection and utilization of condensed water are realized.

Superheated steam in a low-load operation state of a boiler unit in a thermal power plant or a heat power plant is introduced into the steam inlet C, and it is beneficial for peak shaving operation. So that peak load shifting is realized, and resources are sufficiently utilized.

The models of the low-temperature molten salt pump 2 and the high-temperature molten salt pump 18 are LY40-160 double-tube long-shaft submerged pumps. The model of the liquid level sensor 10 is a QH-SP200 capacitor liquid level sensor.

The models of all electric valves (with reference signs of 7, 9, 12, 13, 14 and 15) of the system are optional but not limited to D943H-16C, and can be selected according to different tube diameters. All molten salt electric valves (with reference signs of 1, 6, 16 and 17) in the system are optional but not limited to 150LB-600 high temperature resistant Y molten salt valves, and can be selected according to different tube diameters.

All electric valves, molten salt pumps, molten salt electric valves and liquid level sensors are electrically connected to the control unit, and automatic control of the heat storage and heat release of the whole system can be realized. The control unit is realized by a PLC (Programmable Logic Controller), a single chip microcomputer and other control cores.

The molten salt of the working medium in the system includes, but is not limited to, binary salt (such as a binary salt composed of $NaNO_3$ and $KNO_3$) or ternary salt (such as a ternary salt composed of $KNO_3$, $NaNO_2$ and $NaNO_3$), and is selected according to the amount of the heat storage and the temperature range of the heat storage of the system. The molten salt distribution ring is located at the bottom of each molten salt tank. The larger the temperature range, the more favorable the storage is.

In the heat storage process of the system, the fourth molten salt electric valve 1 and the second molten salt electric valve 16 are opened, the first molten salt electric valve 6 and the third molten salt electric valve 17 are closed, the fifth electric valve 15 and the third electric valve 13 are opened, the liquid level electric valve 12 is opened and closed in real time according to the liquid level of the drum 11, and the second electric valves 9, the first electric valve 7 and the fourth electric valve 14 are closed.

In the heat release process of the system, the first molten salt electric valve 6 and the third molten salt electric valve 17 are opened, the fourth molten salt electric valve 1 and the second molten salt electric valve 16 are closed, the second electric valves 9, the first electric valve 7 and the fourth electric valve 14 are opened, and the fifth electric valve 15, the third electric valve 13 and the liquid level electric valve 12 are closed.

The working principle of the heat storage and heat release system for molten salt with steam heating of the present disclosure is as follows.

Figure 3:
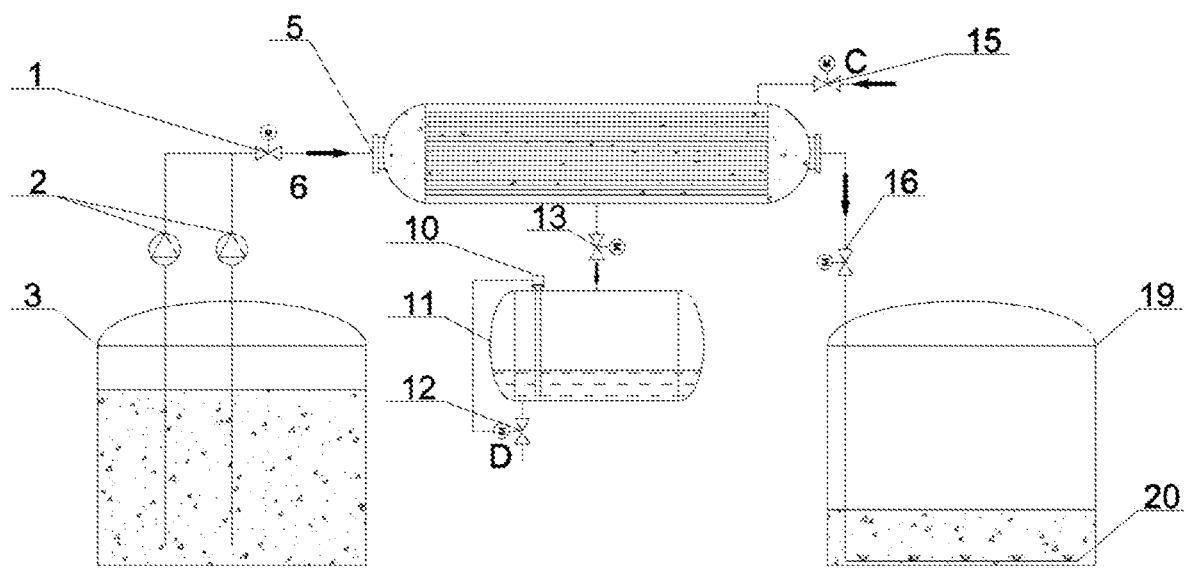
FIG. 3 is a flow diagram of the heat storage of a heat storage and heat release system for molten salt with steam heating according to an embodiment of the present disclosure.

The working process of the system is mainly configured to perform a heat storage process and a heat release process. In the heat storage process (see FIG. 3), the fourth molten salt electric valve 1 and the second molten salt electric valve 16 are opened, the first molten salt electric valve 6 and the third molten salt electric valve 17 are closed, the fifth electric valve 15 and the third electric valve 13 are opened, the electric valve 12 is opened and closed in real time according to the liquid level of the drum 11, and the second electric valves 9, the first electric valve 7 and the fourth electric valve 14 are closed. Industrial steam (i.e. the superheated steam) is introduced into the shell pass of the fixed tube-plate heat exchanger 5 from the steam inlet C through the fifth electric valve 15 to heat the low-temperature molten salt in the tube pass of the fixed tube-plate heat exchanger 5. At the same time, the low-temperature molten salt in the low-temperature molten salt tank 3 is pumped into the tube pass of the fixed tube-plate heat exchanger 5 through the fourth molten salt electric valve 1 by the low-temperature molten salt pumps 2. During the flowing process of the molten salt from the low-temperature side of the fixed tube-plate heat exchanger 5 to the high-temperature side of the fixed tube-plate heat exchanger 5, the molten salt is heated by the heat exchange with the steam in the shell pass. And then the molten salt flows into the high-temperature molten salt tank 19 through the second molten salt electric valve 16 and the high-temperature molten salt distribution ring 20 for heat storage.

In the heat storage process, the phase state of the steam which flows into the shell pass of the fixed tube-plate heat exchanger 5 from the steam inlet C changes, i.e., from water steam to high-temperature liquid water, after this steam is performed the heat exchange with the molten salt in the tube pass to be cooled. The condensed water flows into the drum 11 from the lowest point of the fixed tube-plate heat exchanger 5 through the third electric valve 13 by gravity. When the condensed water in the drum 11 reaches the ¾ height of the drum 11, the liquid level sensor 10 converts the liquid level signal into the electric signal and transmits the electric signal to the liquid level electric valve 12, so as to control the opening of the liquid level electric valve 12, and discharge the condensed water in the drum 11 to the condensed water recovery unit in the factory for condensed water recovery and utilization.

Figure 4:
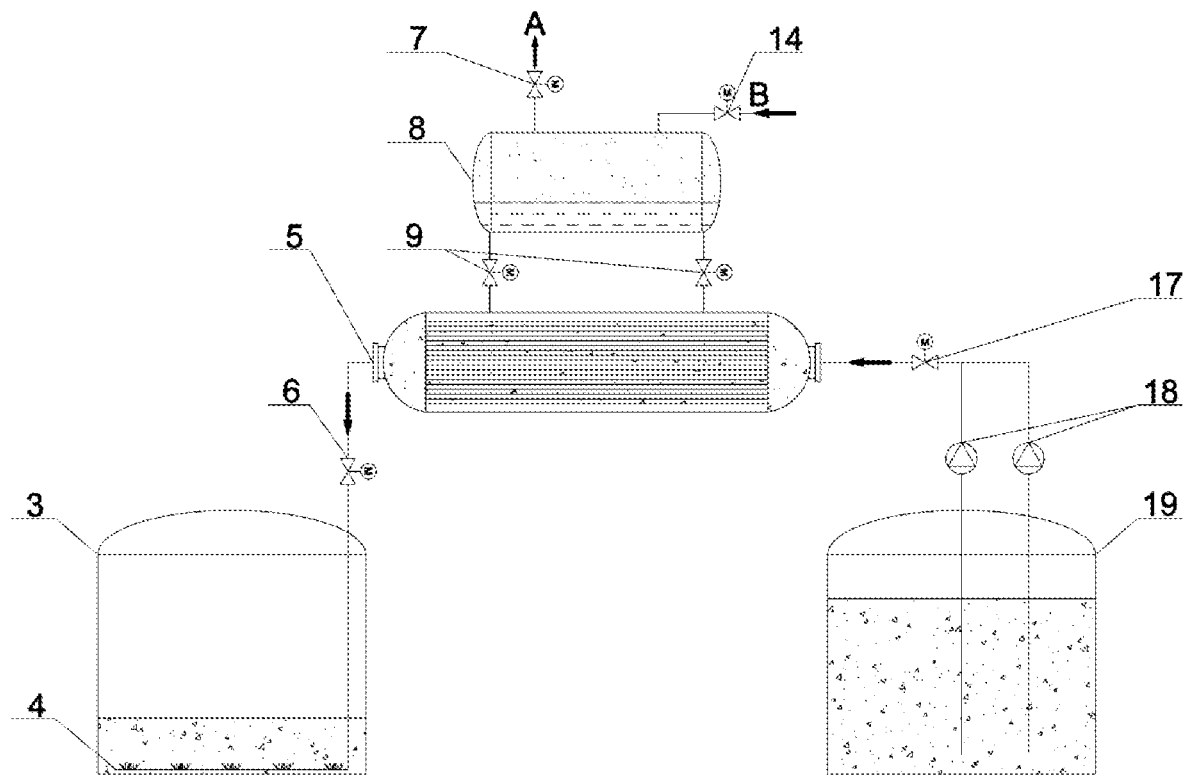
FIG. 4 is a flow diagram of the heat release of a heat storage and heat release system for molten salt with steam heating according to an embodiment of the present disclosure.

In the heat release process (see FIG. 4), the first molten salt electric valve 6 and the third molten salt electric valve 17 are opened, the fourth molten salt electric valve 1 and the second molten salt electric valve 16 are closed, the second electric valves 9, the first electric valve 7 and the fourth electric valve 14 are opened, and the fifth electric valve 15, the third electric valve 13 and the liquid level electric valve 12 are closed. The high-temperature molten salt in the high-temperature molten salt tank 19 is pumped into the tube pass of the fixed tube-plate heat exchanger 5 through the third molten salt electric valve 17 by the high-temperature molten salt pumps 18. During the flowing process of the molten salt from the high-temperature tank side of the fixed tube-plate heat exchanger 5 to the low-temperature tank side of the fixed tube-plate heat exchanger 5, the molten salt is cooled by the heat exchange with the softened water in the shell pass. Then, the molten salt flows through the first molten salt electric valve 6 and uniformly flows into the low-temperature molten salt tank 3 through the low-temperature molten salt distribution ring.

In the heat release process, the softened water replenished from the softened water replenishing port B enters the boiler barrel 8, and the softened water flows into the shell pass of the fixed tube-plate heat exchanger 5 through the second electric valves from the lowest point of the boiler barrel 8 by gravity. The phase state of the softened water changes after being heated by the heat exchange with the high-temperature molten salt in the tube pass of the fixed tube-plate heat exchanger 5, so that the softened water is changed into saturated steam from liquid water phase, and finally the saturated steam is supplied to heat users from the steam outlet A through the first electric valve.

Figure 2:
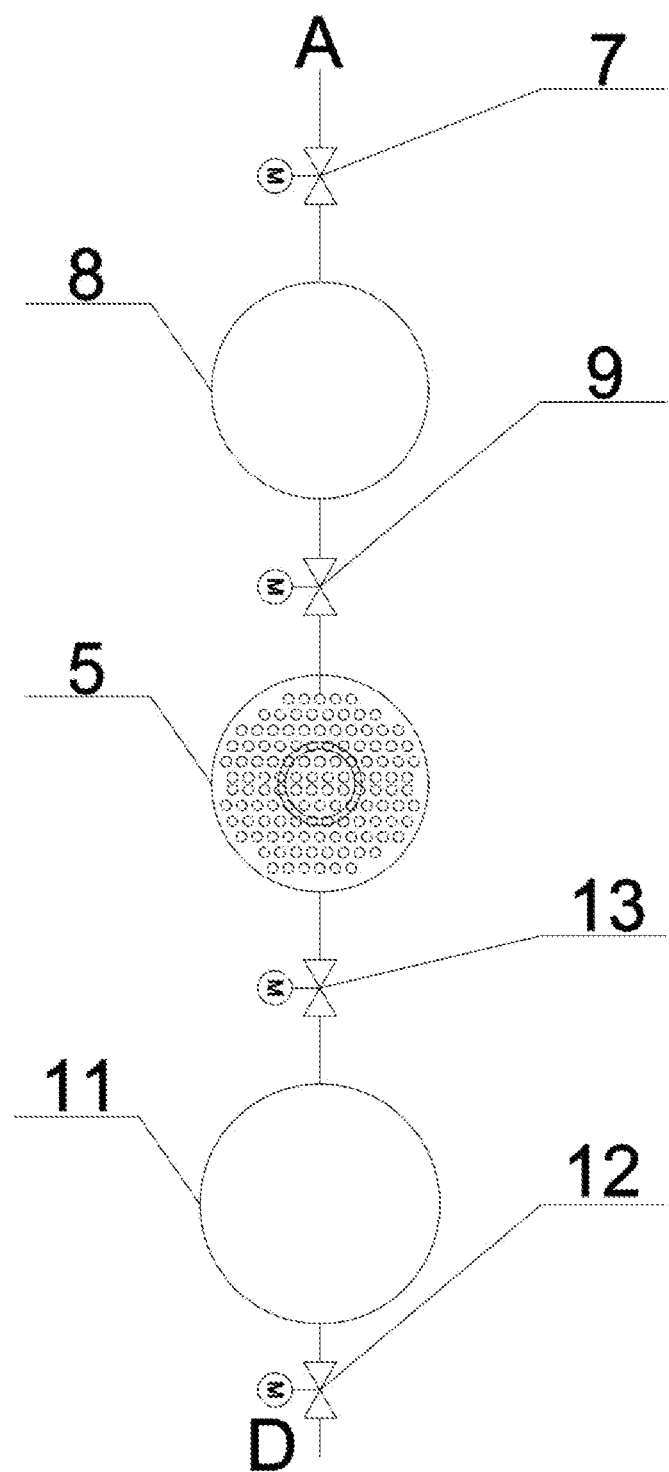
FIG. 2 is a cross-section view of a heat storage and heat release system for molten salt with steam heating along line a-a in FIG. 1 according to an embodiment of the present disclosure.

FIG. 2 is a cross-section view of a heat storage and heat release system for molten salt with steam heating along a-a line in FIG. 1 according to an embodiment of the disclosure. It can be seen from the FIG. 2 that the boiler barrel 8, the fixed tube-plate heat exchanger 5 and the drum 11 are arranged in sequence from top to bottom. Electric valves are correspondingly arranged on the pipes which connect the boiler barrel 8, the fixed tube-plate heat exchanger 5 and the drum 11 in turn, so that the boiler barrel 8, the fixed tube-plate heat exchanger 5 and the drum 11 can form a whole. Such arrangement makes full use of the height difference of the boiler barrel 8, the fixed tube-plate heat exchanger 5 and the drum 11 to integrate the whole equipment together, and the heat storage process and heat release process can be realized on one equipment. So that the pipe connection is greatly simplified, and the occupied area of the equipment is reduced. The fixed tube-plate type heat exchanger 5 in the present disclosure can be combined with the boiler barrel to function as an evaporator on the premise of realizing heat exchange function.

Embodiment I

Disclosed is a heat storage and heat release system for molten salt with steam heating, and the specific parameters are as follows.

The binary molten salt ($NaNO_3$ or $KNO_3$) is used as the molten salt of the working medium in the system, and the temperature range of the molten salt is 220° C. to 560° C. The working temperature of the low-temperature molten salt tank is 250° C. to 280° C., the working temperature of the high-temperature molten salt tank is 410° C. to 540° C., and the temperature of the superheated steam introduced into the steam inlet C is 480° C. is 560° C. In the heat storage process, the 260° C. low-temperature molten salt in the tube pass of the fixed tube-plate heat exchanger exchanges heat with the supersaturated steam in the shell pass which is introduced through the steam inlet C, and the temperature of the molten salt is raised to 420° C. so as to obtain the 420° C. high-temperature molten salt which is stored in the high-temperature molten salt tank. In the heat release process, the 420° C. high-temperature molten salt in the tube pass of the fixed tube-plate heat exchanger exchanges heat with the softened water in the shell pass, and then the temperature of the molten salt is lowered to 260° C. so as to obtain the 260° C. low-temperature molten salt. The low-temperature 260° C. molten salt is stored in the low-temperature molten salt tank, and the softened water in the shell pass is vaporized to generate a 3.0 MPa saturated steam at 225° C. to 235° C. for heat users to use.

Embodiment II

Disclosed is a heat storage and heat release system for molten salt with steam heating, and the specific parameters are as follows.

The binary molten salt (KNOB, $NaNO_2$ or $NaNO_3$) is used as the molten salt of the working medium in the system, and the temperature range is 142° C. to 450° C. The working temperature of the low-temperature molten salt tank is 150° C. to 180° C., the working temperature of the high-temperature molten salt tank is to 260° C. to 300° C., and the temperature of the superheated steam introduced into the steam inlet C is 360° C. is 440° C. In the heat storage process, the 260° C. low-temperature molten salt in the tube pass of the fixed tube-plate heat exchanger exchanges with the supersaturated steam in the shell pass which is introduced through the steam inlet C, and the temperature of the molten salt is raised to 285° C. so as to obtain the 285° C. high-temperature molten salt. The 285° C. high-temperature molten salt is stored in the high-temperature molten salt tank. In the heat release process, the 285° C. high-temperature molten salt in the tube pass of the fixed tube-plate heat exchanger exchanges heat with the softened water in the shell pass, and then the temperature of the molten salt is lowered to 160° C. so as to obtain the 160° C. low-temperature molten salt. The obtained 160° C. low-temperature molten salt is stored in the low-temperature molten salt tank, and the softened water in the shell pass is vaporized to generate a 0.4 MPa saturated steam at 140° C. to 150° C. for heat users to use.

The system of the present disclosure uses the main steam to heat the molten salt, so that a set of electric heater device for molten salt is saved. The heat storage process and the heat release process are performed by one set of equipment. So, the problems of complicated pipelines and low energy utilization rate caused by using two different equipment and pipelines for heat storage and heat release are avoided, and the utilization efficiency of heat energy is significantly improved. At the same time, the specific recovery process of condensed water after steam condensation is fully considered in the storage process of steam heat, so that the full recovery, storage and reuse of steam waste heat are realized.

The parts not described in the present disclosure are applicable to the prior art.

What is claimed is:
1. A heat storage and heat release system for molten salt with steam heating, comprising a low-temperature molten salt tank, a high-temperature molten salt tank, a drum and a boiler barrel, wherein a top of the low-temperature molten salt tank is provided with a first molten salt returning pipe, a first molten salt outlet pipe and a second molten salt outlet pipe; a top of the high-temperature molten salt tank is provided with a second molten salt returning pipe, a third molten salt outlet pipe and a fourth molten salt outlet pipe; the first molten salt outlet pipe and the second molten salt outlet pipe are each provided with a low-temperature molten salt pump; the first molten salt returning pipe is provided with a first molten salt electric valve and a low-temperature molten salt distribution ring; the third molten salt outlet pipe and the fourth molten salt outlet pipe are each provided with a high-temperature molten salt pump; and the second molten salt returning pipe is provided with a second molten salt electric valve and a high-temperature molten salt distribution ring; the low-temperature molten salt distribution ring is connected with the first molten salt returning pipe, the first molten salt returning pipe extends through the top of the low-temperature molten salt tank, and a portion of the first molten salt returning pipe which extending out of the low-temperature molten salt tank is provided with the first molten salt electric valve; the first molten salt outlet pipe and the second molten salt outlet pipe are combined into a first mother tube, and a fourth molten salt electric valve is arranged on the first mother tube; the first mother tube is connected with one end of a tube pass of the fixed tube-plate heat exchanger after converging the first molten salt returning pipe; the high-temperature molten salt distribution ring is connected with the second molten salt returning pipe, the second molten salt returning pipe extends through the top of the high-temperature molten salt tank, and a portion of the second molten salt returning pipe which extending out of the high-temperature molten salt tank is provided with the second molten salt electric valve; the third molten salt outlet pipe and the fourth molten salt outlet pipe are combined into a second mother tube, and a third molten salt electric valve is arranged on the second mother tube; the second mother tube is connected with an other end of the tube pass of the fixed tube-plate heat exchanger after converging the second molten salt returning pipe;

an upper end of the boiler barrel is provided with a softened water replenishing port B and a steam outlet A; the softened water replenishing port B and the steam outlet A are respectively provided with a fourth electric valve and a first electric valve for respectively controlling the opening and closing of the softened water replenishing port B and the steam outlet A; a lowest point of a lower end of the boiler barrel is provided with two pipes connected with a shell pass of the fixed tube-plate heat exchanger; opening and closing of the two pipes at the lowest point of the lower end of the boiler barrel are each controlled by a second electric valve;

an upper end of the drum is provided with a connecting pipe with a lowest point of the shell pass of the fixed tube-plate heat exchanger; a third electric valve is configured to control opening and closing of the connecting pipe between the drum and the lowest point of the shell pass of the fixed tube-plate heat exchanger; a condensed water discharge port D with a liquid level electric valve is provided at a lowest point of a lower end of the drum; a liquid level sensor is arranged in the drum; the liquid level sensor is electrically connected with the liquid level electric valve; and the heat storage and heat release system is configured to perform a heat storage process and a heat release process;

in the heat storage process, the fourth molten salt electric valve and the second molten salt electric valve are configured to be opened, and the first molten salt electric valve and the third molten salt electric valve are configured to be closed; a fifth electric valve and the third electric valve are configured to be opened, the liquid level electric valve is configured to be opened and closed in real time according to a liquid level of the drum, and the second electric valve, the first electric valve and the fourth electric valve are configured to be closed;

a steam inlet C is configured to introduce an industrial steam into the shell pass of the fixed tube-plate heat exchanger through the fifth electric valve to heat a low-temperature molten salt in the tube pass of the fixed tube-plate heat exchanger; at the same time, the low-temperature molten salt pump is configured to pump the low-temperature molten salt in the low-temperature molten salt tank into the tube pass of the fixed tube-plate heat exchanger through the fourth molten salt electric valve; during a flowing process of the molten salt from the one end of the tube pass of the fixed tube-plate heat exchanger to the other end of the tube pass of the fixed tube-plate heat exchanger, the molten salt is heated by first heat exchange with the industrial steam in the shell pass, and then the molten salt flows into the high-temperature molten salt tank through the second molten salt electric valve and the high-temperature molten salt distribution ring for heat storage;

in the heat storage process, a phase state of the industrial steam which flows into the shell pass of the fixed tube-plate heat exchanger from the steam inlet C changes after the first heat exchange and is cooled into condensed water by the molten salt in the tube pass; the condensed water flows into the drum from the lowest point of the shell pass of the fixed tube-plate heat exchanger through the third electric valve by gravity; the liquid level sensor is configured to convert a liquid level signal into an electric signal and transmit the electric signal to the liquid level electric valve when the condensed water in the drum reaches an upper level limit of the drum, so as to open the liquid level electric valve, and discharge the condensed water in the drum to a condensed water recovery unit in a factory for recovery and utilization of the condensed water;

in the heat release process, the first molten salt electric valve and the third molten salt electric valve are configured to be opened, and the fourth molten salt electric valve and the second molten salt electric valve are configured to be closed; the second electric valves, the first electric valve and the fourth electric valve are configured to be opened, and the fifth electric valve, the third electric valve and the liquid level electric valve are configured to be closed;

the high-temperature molten salt pump is configured to pump the high-temperature molten salt in the high-temperature molten salt tank into the tube pass of the fixed tube-plate heat exchanger through the third molten salt electric valve; during a flowing process of the molten salt from the other end of the tube pass of the fixed tube-plate heat exchanger to the one end of the tube pass of the fixed tube-plate heat exchanger, the molten salt is cooled by second heat exchange with the softened water in the shell pass, and then the molten salt flows through the first molten salt electric valve and uniformly flows into the low-temperature molten salt tank through the low-temperature molten salt distribution ring;

in the heat release process, the softened water replenished from the softened water replenishing port B enters the boiler barrel, and the softened water flows into the shell pass of the fixed tube-plate heat exchanger through the second electric valve from the lowest point of the boiler barrel by gravity; a phase state of the softened water changes after the second heat exchange with the molten salt in the tube pass of the fixed tube-plate heat exchanger, then the softened water is changed into saturated steam from liquid water phase, and finally the saturated steam is supplied to heat users from the steam outlet A through the first electric valve.

2. The heat storage and heat release system according to claim 1, wherein the first molten salt electric valve, the second molten salt electric valve, the third molten salt electric valve, the fourth molten salt electric valve, the first electric valve, the second electric valve, the third electric valve, the fourth electric valve, the fifth electric valve, the liquid level electric valve, the low-temperature molten salt pump, the high-temperature molten salt pump and the liquid level sensor are electrically connected to a control unit.

3. The heat storage and heat release system according to claim 1, wherein the industrial steam introduced into the steam inlet C is superheated steam from a boiler unit which is in a low-load operation state in a thermal power plant or a heat power plant.

4. The heat storage and heat release system according to claim 1, wherein the low-temperature molten salt pump and the high-temperature molten salt pump are each a LY40-160 double-tube long-shaft submerged pump.

5. The heat storage and heat release system according to claim 1, wherein the boiler barrel, the fixed tube-plate heat exchanger and the drum are arranged from high to low, are respectively located at different levels, and are connected in sequence through pipelines, and each of the pipelines is provided with an electric valve for the pipelines;

at least one first molten salt outlet pipe and at least one first molten salt returning pipe from the low-temperature molten salt tank are connected with the tube pass of the fixed tube-plate heat exchanger, and at least one second molten salt outlet pipe and at least one second molten salt returning pipe from the high-temperature molten salt tank are connected with the shell pass of the fixed tube-plate heat exchanger; the first mother tube for converging the at least one first molten salt outlet pipe of the low-temperature molten salt tank and the second mother tube for converging the at least one second molten salt outlet pipe of the high-temperature molten salt tank are each provided with a molten salt electric valve, and a third mother tube for converging the at least one first molten salt returning pipe of the low-temperature molten salt tank and a fourth mother tube for converging the at least one second molten salt returning pipe of the high-temperature molten salt tank are each provided with a molten salt electric valve; and the condensed water discharge port is provided at a bottom of the drum, the steam outlet and the softened water replenishing port are provided on the boiler barrel, and the steam inlet is provided on the fixed tube-plate heat exchanger.

6. The heat storage and heat release system according to claim 5, wherein each of the at least one first molten salt outlet pipe of the low-temperature molten salt tank and the at least one second molten salt outlet pipe of the high-temperature molten salt tank is provided with a molten salt pump, and a bottom end of each of the at least one first molten salt returning pipe and the at least one second molten salt returning pipe extends into a corresponding one of the low-temperature molten salt tank and the high-temperature molten salt tank, and is connected with a corresponding one of molten salt distribution rings; the molten salt is a circulation working medium in the tube pass of the fixed tube-plate heat exchanger, and the water and the steam is a circulation working medium in the shell pass of the fixed tube-plate heat exchanger.

7. The heat storage and heat release system according to claim 5, wherein the high-temperature molten salt tank and the low-temperature molten salt tank are respectively arranged to be lower than the fixed tube-plate heat exchanger, and located below the fixed tube-plate heat exchanger.

8. The heat storage and heat release system according to claim 5, wherein a remote liquid level meter is arranged in the drum, the remote liquid level meter is configured to collect data for the liquid level of condensed water in the drum, the liquid level electric valve is arranged on a pipe of the condensed water discharge port, the condensed water discharge port is connected with the external condensed water recovery unit, the liquid level electric valve is configured to be opened when the liquid level in the drum reaches ¾ of a height of the drum, and the liquid level electric valve is configured to be closed when the liquid level in the drum drops below ¼ of the height of the drum.

9. The heat storage and heat release system according to claim 5, wherein outer walls of the low-temperature molten salt tank, the high-temperature molten salt tank, the fixed tube-plate heat exchanger, the boiler barrel, the drum, the pipelines, the at least one first molten salt outlet pipe, the at least one first molten salt returning pipe, the at least one second molten salt outlet pipe, the at least one second molten salt returning pipe, the first mother tube, the second mother tube, the third mother tube, the fourth mother tube, the electric valve for the pipelines, the liquid level electric valve and the molten salt electric valve are all covered with insulating layers, and a thermal conductivity of materials used for the insulating layers is not higher than 0.04 W/(m·K); the low-temperature molten salt tank and the high-temperature molten salt tank are made of 0Cr19Ni9; the fixed tube-plate heat exchanger, the boiler barrel and the drum are made of 0Cr17Ni12Mo2.

* * * * *